Patented Aug. 21, 1945

2,383,070

UNITED STATES PATENT OFFICE 2,383,070

DRY MILK PRODUCT AND THE PREPARATION THEREOF

Donald E. Mook, Perry, N. Y., assignor to The Borden Company, New York, N. Y., a corporation of New Jersey No Drawing. Application July 31, 1940, Serial No. 348,737

10 Claims. (Cl. 99—203)

This application is a continuation-in-part of my application Serial No. 52,189, filed November 29, 1935.

This invention relates to the treatment of milk products, and more particularly to the preparation of dried milk products which have been processed to improve the viscosity, whipping, stabilizing and other properties when the product is mixed with water.

Large quantities of dried milk powder are used in the manufacture of ice cream. For example, skim milk powder is usually mixed with cream, sugar, water and relatively small amounts of gelatin and egg yolk to provide a mix with a solids content of about 35 to 46%. This mix is then usually pasteurized, homogenized and cooled. The mix may be held for a suitable aging period after cooling, and portions of it are then whipped and frozen in any suitable apparatus with added flavorings to produce the ice cream. The usual formula for preparing an ice cream mix calls for the addition of 0.5% of gelatin and an amount up to 1% of egg yolk solids.

It is an object of this invention to provide a method of treating milk products whereby a dried milk may be obtained that is superior in viscosity, density, stabilizing value and other properties to ordinary milk powders.

Another object of the invention is to provide an improved dried milk product that can be used without any gelatin or with only a fraction of the usual amount of gelatin for making a satisfactory ice cream mix.

A further object of the invention is to accomplish the foregoing results and other improvements in dried milk without any substantial alteration of the flavor of the dried milk powder.

I have discovered that fluid milk products can be processed prior to drying of the products to produce important improvements in the properties of the dried products without altering the composition of the dried product or substantially altering the flavor thereof. Such a processing involves the superheating of the fluid milk product in a condensed form prior to the drying operation. The fluid milk product may be preheated before condensing at the usual temperature of about 142 to 160° F. to prevent bacterial growth. I have found, however, that greatly improved results are obtained if the milk is preheated at a temperature of around 170° F. In general, the milk may be preheated at any suitable temperature from 142 to 175° F., preferably within the range of 160 to 175° F. Optimum results with respect to viscosity of the final product are obtained if the preheating temperature is around 170° F. and if the preheating temperature of the uncondensed milk product is substantially above 175° F., the viscosity of the final dried product when reconstituted with water is considerably impaired.

After the milk has been preheated, if this is considered desirable, the fluid milk product is condensed to a milk solids-not-fat content of at least about 20%. For the production of a dried product, condensation of the fluid milk product to a milk solids-not-fat content of about 35 to 45% is preferred, although higher concentrations may be satisfactory if the milk product is not rendered too thick for easy handling. The condensation of the milk product may be conveniently carried out in a partial vacuum at a fairly low temperature.

The condensed fluid milk product is then subjected to a superheating treatment at a temperature of at least 170° F., and preferably within the range of 180 to 210° F., although higher temperatures may be used with the condensed milk under pressure. This superheating may be carried out by direct injection of steam into the product or by the indirect application of heat to the surface of the vessel containing the fluid milk product, the use of steam coils or in any other suitable manner.

If desired, the superheating may be carried out under pressures higher than atmospheric pressures, enabling the use of superheating temperatures above 212° F., and in some cases, even up to 300° F.

An important feature of the superheating treatment for preparing a dried product is to hold the condensed fluid milk product at a maximum superheating temperature used for a sufficient time to actually curdle the milk. In fact, the milk is preferably heated beyond the curdling point until the curd is slightly toughened. The time that will be required to produce a slightly toughened curd will vary with the concentration of the fluid milk product, the temperature of superheating and with different batches of fluid milk.

In general, this time usually will vary from a few seconds to 30 minutes. In some cases, it will be found that the desired curdling point and slightly toughened curd formation is obtained while the product is being heated up to the superheating temperature and perhaps even before it reaches the intended maximum superheating temperature. In other cases, the condensed fluid milk product will have to be superheated to the desired temperature and held at this temperature until the formation of the slightly toughened curd is obtained.

At this stage, the curd that is formed tends to separate from the whey and the mixture of curd and whey may then be smoothed out, and dried in any suitable manner. Spray drying is particularly satisfactory for this purpose, and a spray drying process similar to that described in the Merrell et al Patent No. 860,929 may be used. The superheated condensed milk product may be dried by other means if desired, for example, by the roller drying method.

This processing of milk to prepare a dried milk product may be carried out continuously, but it has been found that better results are obtained if the milk is treated in batches, inasmuch as the treatment of the fluid milk product in a more or less quiescent state appears to produce somewhat higher viscosities when the dried milk product is reconstituted with water to form a fluid.

While the invention is particularly suitable for preparing dried skim milk powder, it may also be applied to the preparation of partially skimmed or whole milk powders.

I have found that a skim milk powder prepared in accordance with my invention when reconstituted with water has a viscosity from about 4 to 8 times the viscosity of a similar skim milk powder which is prepared by simply condensing the skim milk and drying the condensed skim milk. This improved viscosity appears to be due, at least in part, to an improved water absorptive capacity of the powder. In some cases, the viscosity of a reconstituted skim milk powder processed according to this invention may be made more than 10 times the viscosities of solutions obtained with ordinary skim milk powder.

Dried milk products prepared by superheating condensed milk products in accordance with this invention make possible the manufacture of ice cream without any gelatin, and in the usual mix it is desirable to use less than 75% of the amount of gelatin normally required. This surprising result is obtained without the addition of any chemical or other material to the powder or the use of any substitute for the gelatin. Furthermore, this result is achieved without any noticeable alteration in flavor of the skim milk powder as compared with ordinary skim milk powder.

When my improved skim milk powder is used for making ice cream, the ice cream mix is also given an improved whipping quality, and less egg yolk can be used because of the improved emulsifying effect of this skim milk powder. In addition, ice cream made with this powder can be drawn from the freezer at a temperature of about 1° higher than the drawing temperature of ice cream made with ordinary skim milk powder. In other words, the same amount of stiffness in the ice cream is obtained at 24° F. with ice cream made with milk powder prepared according to this invention as is obtained with ordinary ice cream at 23° F. This results in the ice cream having an improved ability to stand up in the cabinet under changing temperature conditions.

Physically, a milk powder prepared according to this invention and dried by a spray drying method is not as dusty to handle and has a higher specific gravity or greater density than an ordinary milk powder. In fact, my improved skim milk powder can be packed in barrels in an amount from 230 to 240 lbs. per barrel, whereas 200 lbs. or less of ordinary skim milk powder fills such a barrel completely.

While particular reference has been made to the use of my improved skim milk powder in the manufacture of ice cream, it will be apparent that skim milk powder or other milk powders prepared according to this invention may be used for other purposes where the improvements in viscosity, density and other properties thereof are of value.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of preparing an improved dry milk product comprising condensing a fluid milk product to produce a milk solids-not-fat content of at least about 20%, superheating said condensed milk product at a temperature above 160° F. for a sufficient time to produce a slightly toughened curd, and drying said condensed superheated milk product.

2. A method of preparing a dry milk product comprising preheating a fluid milk product at a temperature less than about 175° F., condensing said fluid milk product to produce a milk solids-not-fat content of at least about 20%, superheating said condensed milk product at a temperature above 160° F. for a sufficient time to produce a slightly toughened curd, and drying said condensed superheated milk product.

3. A method of preparing an improved dry milk product comprising condensing a fluid milk product to produce a milk solids-not-fat content of at least about 20%, superheating said condensed milk product at a temperature of about 180 to 210° F. for a time sufficient to produce a slightly toughened curd, and drying said condensed superheated milk product.

4. A method of preparing a dry milk product comprising preheating a fluid milk product at a temperature of about 160 to 175° F., condensing said milk product to produce a milk solids-not-fat content of about 30 to 50%, superheating said condensed milk product at a temperature above 160° F. beyond the thickening point and until a slightly toughened curd is formed, and drying said condensed superheated milk product.

5. A method of preparing skim milk powder comprising preheating fluid skim milk at a temperature of about 160 to 175° F., condensing said fluid skim milk to produce a solids content of about 30 to 50%, superheating said condensed skim milk at a temperature of about 180 to 210° F. for a sufficient time to form a slightly toughened curd, and drying said superheated condensed skim milk.

6. A method of preparing skim milk powder comprising preheating fluid skim milk at a temperature of approximately 170° F., condensing said skim milk to produce a solids content of about 35 to 45%, superheating said condensed skim milk at a temperature of about 180 to 210° F. for a sufficient time to form a slightly toughened curd, and spray drying said superheated condensed skim milk.

7. A dried milk product of unaltered composition having a high specific gravity, water absorptive capacity and an increased viscosity when reconstituted with water, said product comprising a dried milk product prepared by condensing a fluid milk product to a milk solids-not-fat content of at least 20%, superheating such condensed milk product at a temperature above 160° F. for a sufficient time to form a slightly toughened curd, and drying the superheated condensed milk product.

8. A dried milk product of normal composition having a high specific gravity, water absorptive capacity and an increased viscosity when reconstituted with water, said product comprising a dried milk product prepared by preheating a fluid milk product at a temperature of about 160 to 175° F., condensing said milk product to a milk solids-not-fat content of at least 20%, superheating such condensed milk product at a temperature above 160° F. for a sufficient time to form a slightly toughened curd, and drying the superheated condensed milk product.

9. A skim milk powder of unaltered composition but having an increased density, water absorptive capacity and viscosity when reconstituted with water, said powder comprising a skim milk powder prepared by condensing skim milk to a solids content of about 35 to 45%, superheating said condensed skim milk at a temperature of about 180 to 210° F. to form a slightly toughened curd, and drying said superheated condensed skim milk.

10. Skim milk powder of normal composition, prepared by preheating fluid skim milk at a temperature of about 160 to 175° F., condensing said fluid skim milk to a solids content of about 35 to 45%, superheating said condensed skim milk at a temperature of about 180 to 210° F. to form a slightly toughened curd, and spray drying said superheated condensed skim milk.

DONALD E. MOOK.